(12) United States Patent
Madhavan et al.

(10) Patent No.: US 7,826,833 B2
(45) Date of Patent: Nov. 2, 2010

(54) CHANNEL ASSAY FOR THIN CLIENT DEVICE WIRELESS PROVISIONING

(76) Inventors: P. G. Madhavan, 5557 Lakemont Blvd. SE., #1204, Bellevue, WA (US) 98052; Scott Manchester, 17314 NE. 25th Way, Redmond, WA (US) 98052

(*) Notice: Subject to any disclaimer, the term of this patent is extended or adjusted under 35 U.S.C. 154(b) by 884 days.

(21) Appl. No.: 11/060,290

(22) Filed: Feb. 17, 2005

(65) Prior Publication Data
US 2006/0183490 A1 Aug. 17, 2006

(51) Int. Cl.
*H04M 3/00* (2006.01)
*H04M 1/00* (2006.01)
*H04B 17/00* (2006.01)

(52) U.S. Cl. .................. 455/418; 455/558; 455/559; 455/557; 455/67.1

(58) Field of Classification Search .............. 455/67.7, 455/446, 447, 67.1, 558, 557, 559, 418
See application file for complete search history.

(56) References Cited

U.S. PATENT DOCUMENTS

| 5,933,504 | A | 8/1999 | Vanstone et al. |
| 6,052,720 | A | 4/2000 | Traversat et al. |
| 6,078,667 | A | 6/2000 | Johnson |
| 6,148,354 | A | 11/2000 | Ban et al. |
| 6,178,507 | B1 | 1/2001 | Vanstone |
| 6,195,433 | B1 | 2/2001 | Vanstone et al. |
| 6,449,642 | B2 | 9/2002 | Bourke-Dunphy et al. |
| 6,526,264 | B2 | 2/2003 | Sugar et al. |
| 6,563,928 | B1 | 5/2003 | Vanstone et al. |
| 6,654,841 | B2 | 11/2003 | Lin |
| 6,687,492 | B1 | 2/2004 | Sugar et al. |
| 6,700,450 | B2 | 3/2004 | Rogers |
| 6,714,605 | B2 | 3/2004 | Sugar et al. |
| 6,728,517 | B2 | 4/2004 | Sugar et al. |
| 6,785,520 | B2 | 8/2004 | Sugar et al. |
| 6,801,756 | B1* | 10/2004 | Agrawal et al. ........... 455/67.11 |
| 6,850,735 | B2 | 2/2005 | Sugar et al. |
| 7,035,593 | B2* | 4/2006 | Miller et al. ............. 455/67.11 |
| 2001/0014153 | A1 | 8/2001 | Johnson |
| 2002/0087868 | A1* | 7/2002 | King et al. ................... 713/185 |
| 2002/0090085 | A1 | 7/2002 | Vanstone et al. |
| 2002/0152380 | A1 | 10/2002 | O'Shea et al. |

(Continued)

OTHER PUBLICATIONS

Kent, S. et al., "IP Authentication Header," Network Working Group RFC 2402, Nov. 1998, 22 pages.

(Continued)

*Primary Examiner*—Tilahun Gesesse
(74) *Attorney, Agent, or Firm*—Marshall, Gerstein & Borun LLP (57) ABSTRACT

The task of configuring a thin client device for networking functionality and connectivity is simplified using a portable computer-readable media device to transfer and automatically load RF interference data into a provisioning device. A wireless radio frequency channel that is usable for the wireless protocol to be employed by the device and which is not currently experiencing prohibitive RF interference is selected by the provisioning device based on the interference data. The portable media device includes, in an embodiment of the invention, a spectrum chip and its support electronics such as a radio receiver and receive-chain processor, to analyze ongoing local RF emissions/transmissions to identify a channel having the least interference.

15 Claims, 7 Drawing Sheets

U.S. PATENT DOCUMENTS

| | | | |
|---|---|---|---|
| 2002/0152384 | A1 | 10/2002 | Shelest et al. |
| 2003/0101247 | A1 | 5/2003 | Kumbalimutt et al. |
| 2003/0224741 | A1* | 12/2003 | Sugar et al. ............... 455/115.1 |
| 2003/0225971 | A1 | 12/2003 | Oishi et al. |
| 2004/0002943 | A1 | 1/2004 | Merrill et al. |
| 2004/0010429 | A1 | 1/2004 | Vedula et al. |
| 2004/0024875 | A1 | 2/2004 | Horvitz et al. |
| 2004/0038592 | A1 | 2/2004 | Yang |
| 2004/0221298 | A1* | 11/2004 | Cedola ........................ 719/321 |
| 2005/0118977 | A1* | 6/2005 | Drogi et al. .................. 455/323 |
| 2005/0163042 | A1* | 7/2005 | Roberts ....................... 370/208 |
| 2006/0013160 | A1* | 1/2006 | Haartsen ...................... 370/328 |

OTHER PUBLICATIONS

Kent, S. et al., "IP Encapsulating Security Payload (ESP)," Network Working Group RFC 2406, Nov. 1998, 22 pages.

Harkins et al., "The Internet Key Exchange (IKE)," Network Working Group RFC 2409, Nov. 1998, 41 pages.

Rescorla, E., "Diffie-Hellman Key Agreement Method," Network Working Group RFC 2631, Jun. 1999, 13 pages.

U.S. Appl. No. 10/806,369, filed Mar. 23, 2004, Manchester et al.

U.S. Appl. No. 10/806,331, filed Mar. 23, 2004, Manchester et al.

U.S. Appl. No. 10/806,772, filed Mar. 23, 2004, Freeman et al.

U.S. Appl. No. 10/806,836, filed Mar. 23, 2004, Manchester et al.

U.S. Appl. No. 10/807,095, filed Mar. 23, 2004, Manchester et al.

U.S. Appl. No. 60/534,795, filed Jan. 7, 2004, Abraham et al.

U.S. Appl. No. 60/592,506, filed Jul. 30, 2004, Corbett et al.

U.S. Appl. No. 10/967,368, filed Oct. 18, 2004, Crosier et al.

U.S. Appl. No. 10/999,555, filed Nov. 30, 2004, Corbett et al.

Bailie, et al., "The Networked Digital Home," *Soundscapes Info*, (2002) printed Mar. 29, 2004, pp. 1-2, <http://icce.rug.nl/~soundscapes/VOLUME05/LSI_mediacast.html>.

Balfanz, et al., *Talking to Strangers: Authentication in ad hoc Wireless Networks*, In Symposium on Network and Distributed Systems Security, San Diego, California, 2002, printed Mar. 24, 2004, pp. 1-14, <http://citeseer.ist.psu.edu/balfanz02talking.htm>.

Huang, et al., *Making Computers Disappear: Appliance Data Services*, pp. 1-14, Mobilcom 2001, Rome, Italy (2001).

Maitland, *Okapi Unlocks iSCSI*, printed Mar. 24, 2004, pp. 1-9, (2003-2004) <http://www.byteandswitch.com/document.asp?doc_id=19173>.

Schroder, *USB Pen Drives: Large Portable Storage in a Tiny Package*, (Dec. 2003) printed Mar. 24, 2004, pp. 1-9, <http://networking.earthweb.com/nethub/article.php/109503291891_1>.

Unknown, *Using Smart Cards With the Sun Ray 1 Enterprise Appliance*, Revision 01, pp. 1-15, Palo Alto, California (Sep. 1999).

Unknown, *Integrating Sun Ray 1 Enterprise Appliances and Microsoft Windows NT*, Sun Microsystems, Inc., pp. 1-19, Palo Alto, California (2000).

Unknown, *Smart Card for Temporary Facilities Security*, Information Methods Incorporated Group, LLC, pp. 1-16, (Jan. 2004).

Unknown, *Sun Ray Overview*, Sun Microsystems, Inc., pp. 1-28, Santa Clara, California (Apr. 2003).

Unknown, *Sun Ray Interoperability Brief*, Sun Microsystems, Inc., pp. 1-14, Santa Clara, California (Aug. 2003).

Unknown, "Sun Ray," *Editor's Choice Communication Solutions*, (Jun. 2004) printed Mar. 26, 2004, pp. 1-8, <http://www.tmcnet.com/comsol/0601/0601lab2.htm>.

Unknown, "Linksys Instant Wireless USB Network Adapter WUSB11 Network Adapter," *Product Review*, (2004) printed Mar. 24, 2004, pp. 1-4, <http://hardwarecentral.dealtime.com/x PR_Linksys_Instant_Wireless_WUSB11>.

Wakefield, *Wireless Technology and Your Mobile Device*, Microsoft Support WebCast, transcript pp. 1-13, slides pp. 1-60, printed Oct. 31, 2002, <http://support.microsoft.com/default.aspx?acid+%2Fservicedesks%2Fwebcasts%2Fen%2Fwc103102.asp>.

Ylisaukko-Ojai, et al., *Low Capacity Wireless Home Networks—Cheap and Simple Interconnections between Devices*, pp. 1-20, Version 1.0, Ilkk Korhonen,(May 2002).

Nexware Corporation, "Software Solutions: Networked Solutions," Nexwarecorp.com (2001), printed Mar. 29, 2004, pp. 1, <http://www.nexwarecorp.com/products/networked_solutions.htm>.

* cited by examiner

CHANNEL ASSAY FOR THIN CLIENT DEVICE WIRELESS PROVISIONING

FIELD OF THE INVENTION

This invention pertains generally to computer network device configuration and, more particularly, to configuring a wireless computer network thin client device to utilize a particular communication channel.

BACKGROUND OF THE INVENTION

The use of computer networks continues to grow in many commercial, institutional and home settings. As computer networks become more prevalent, ways of simplifying the networks and increasing efficiency, productivity, and ease of administration are also becoming critical. One significant network improvement in recent years has been the advent of wireless networking. The use of wireless network technology in the home has become especially popular as of late. In addition to facilitating Internet connectivity, home networking permits personal computing devices and various consumer electronic devices and appliances within the home to communicate with each other. Wireless technology, such as used in IEEE 802.11 wireless networks and networks of Bluetooth-enabled devices, is attractive in home as well as corporate environments for reasons of convenience, mobility and flexibility.

As with many networking technologies, one impediment to the wider adoption of wireless networking technology has been the difficulty experienced by non-expert users in configuring network devices. This is especially true in informal settings lacking dedicated network administrators. Configuring network devices often requires substantial and in-depth knowledge of the nature of networking as well as the hardware, software, and protocols of the network. With respect to "thin-client" devices that typically run a reduced version of an operating system and do not have support for standard user interface components (e.g., a monitor, keyboard, and/or mouse), this problem is even more daunting; the user is not even able, with respect to such devices, to access the familiar features and aspects that generally provide them comfort and assistance. This lack of standard I/O capabilities very often may preclude the casual and non-expert user from configuring a thin client device for a home network, thus causing a substantial impediment to technology adoption.

One of the more difficult problems facing users of wireless technology is radio interference. Wireless protocols typically allow operation at one of a number of different frequencies or "channels." Each channel represents a portion of the radio frequency (RF) spectrum. When multiple devices use the same portion of the RF spectrum at the same time, each will typically experience radio interference. The effects of interference range from complete inability to communicate at the worst to greatly increased error rates at the best. Either effect is detrimental to network performance and is preferably to be avoided. In order to avoid RF interference, RF (wireless) devices that are not intending to communicate with each other should operate on different channels. In some wireless technologies, adjacent or harmonic channels to one already in use are also to be avoided. In addition, devices other than wireless networking devices may also impact channel availability. For example, a number of toys and appliances generate RF radiation purposefully or incidentally, and such RF radiation may interfere with one or more wireless networking channels.

The typical casual or non-expert user will not know what RF spectrum use is ongoing and will be unable to properly select a channel for wireless device operation. Thus, in addition to the difficulty of provisioning thin client wireless devices generally, the casual user also faces an additional hurdle of somehow selecting an interference free channel. Thus there is a pressing and unresolved need for a simple and easy way to configure such thin client devices for optimal network connectivity on one or more appropriate wireless channels.

BRIEF SUMMARY OF THE INVENTION

In accordance with the invention, the task of configuring a thin client device for networking functionality and connectivity is made particularly simple and easy by using a portable computer-readable media device, such as a USB flash drive or an SD memory card, or other externally installable device, to transfer and automatically load network settings into the thin client device. The configuration data includes an identification of an appropriate wireless radio frequency channel over which the device is to transmit and receive data. The wireless radio frequency channel is selected as a channel that is usable for the wireless protocol to be employed by the device but which is not currently experiencing prohibitive RF interference. The portable media device includes, in an embodiment of the invention, a spectrum chip and its support electronics such as a radio receiver and receive-chain processor, to analyze ongoing local RF emissions/transmissions to identify a channel having the least interference. Measurements of the RF environment are taken at various times to be uploaded into a host such as a host PC. In an alternative embodiment of the invention, the data is processed within the portable media device itself so that there is no need for a host device especially configured to process the interference data. Thus, either the portable media device has wireless processing to determine an appropriate channel or the host that writes the configuration information to the portable media device has the RF processing facilities and determines the appropriate channel.

A user is then able to install the portable media device in a thin client computing device to transfer the configuration data and any other data to the device. The thin client device detects the connection of the portable media device and automatically loads the configuration data, and may provide signals to indicate completion of the configuration operation. Alternatively or additionally, the data can be held in the portable media for later upload. A Channel Assay application on a host PC or on the portable media device itself includes heuristics to correlate the RF environment with the device and time of day and select the best possible (i.e., least interference overall) WLAN channel to use for communication. A network setup wizard is used in an embodiment of the invention to download the channel information to the device to be provisioned as will be described later. If the wireless network performance is later seen to deteriorate, the RF measurement and channel assay process can be repeated to find the best channel under the changed RF environment. The device will provide the wireless heuristics to the Network Setup Wizard that will determine to which channel the wireless access points should be assigned. As a result, a thin client device may be provisioned with the network settings and other configuration data quickly and conveniently without the need for a more conventional user interface.

Additional features and advantages of the invention will be apparent from the following detailed description of illustrative embodiments which proceeds with reference to the accompanying figures.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION OF THE INVENTION

Methods and systems for configuring network devices with a portable media device will now be described with respect to various embodiments. The skilled artisan will readily appreciate that the methods and systems described herein are merely exemplary and that variations can be made without departing from the spirit and scope of the invention.

The present invention will be more completely understood through the following detailed description, which should be read in conjunction with the attached drawings. In this description, like numbers refer to similar elements within various embodiments of the present invention. The invention is illustrated as being implemented in a suitable computing environment. Although not required, the invention will be described in the general context of computer-executable instructions, such as procedures, being executed by a personal computer. Generally, procedures include program modules, routines, functions, programs, objects, components, data structures, etc. that perform particular tasks or implement particular abstract data types. Moreover, those skilled in the art will appreciate that the invention may be practiced in a variety of computer system configurations, including handheld devices, multi-processor systems, and microprocessor-based or programmable consumer electronics devices. The invention may also be practiced in distributed computing environments where tasks are performed by remote processing devices that are linked through a communications network. In a distributed computing environment, program modules may be located in both local and remote memory storage devices. The term computer system may be used to refer to a system of computers such as may be found in a distributed computing environment.

Figure 1:
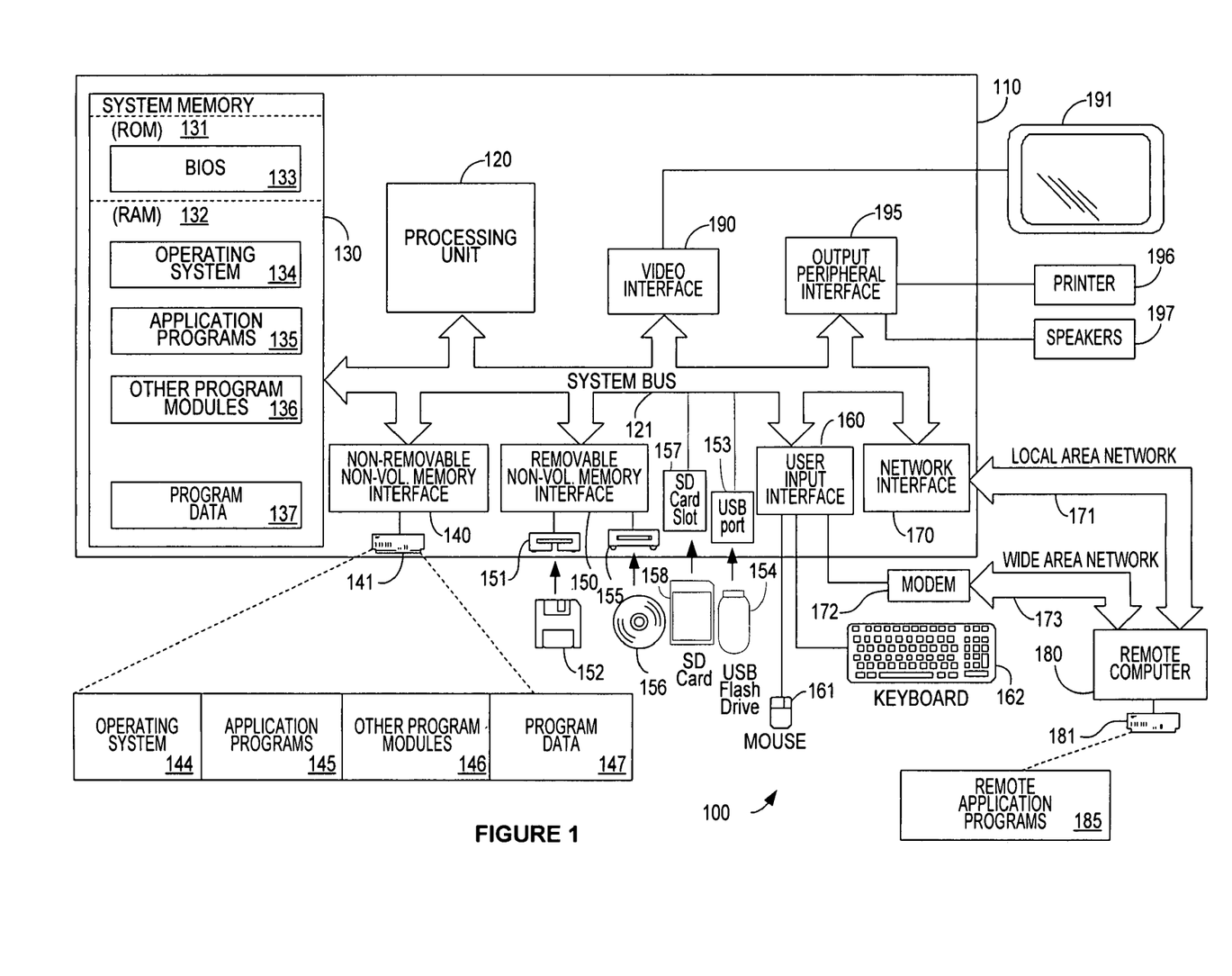
FIG. 1 is a schematic diagram illustrating an exemplary architecture of a computing device that may be used as part of a process of configuring a thin client computing device in accordance with an embodiment of the invention.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Nor should the computing environment 100 be interpreted as having any dependency or requirement relating to any one or combination of components illustrated in the exemplary operating environment 100. Although at least one embodiment of the invention does include each component illustrated in the exemplary operating environment 100, another more typical embodiment of the invention excludes some or all non-essential components, for example, input/output devices other than those required for network communications.

That said, one example system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures.

The computer 110 typically includes a variety of computer-readable media. Computer-readable media can be any available media that can be accessed by the computer 110 and include both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above are included within the scope of computer-readable media.

The system memory 130 includes computer storage media in the form of volatile and/or nonvolatile memory such as read only memory (ROM) 131 and random access memory (RAM) 132. By way of example, and not limitation, FIG. 1 illustrates operating system 134, application programs 135, other program modules 136 and program data 137.

The computer 110 may also include other removable and non-removable, volatile and nonvolatile computer storage media. By way of example only, FIG. 1 illustrates a hard disk drive 141 that reads from or writes to non-removable, non-volatile magnetic media, a magnetic disk drive 151 that reads from or writes to a removable, nonvolatile magnetic disk 152, and an optical disk drive 155 that reads from or writes to a removable, nonvolatile optical disk 156 such as a CDROM. Other computer storage media that can be used in the exemplary operating environment include, but are not limited to, magnetic tape cassettes, flash memory cards, DVDs, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The computer system may include interfaces for additional types of removable non-volatile storage devices. For instance, the computer may have a USB port 153 that can accept a USB flash drive (UFD) 154, or a SD card slot 157 that can accept a Secure Digital (SD) memory card 158. A USB flash drive is a flash memory device that is fitted with a USB connector that can be inserted into a USB port on various computing devices. A SD memory card is a stamp-sized flash memory device. Both the USB flash drive and SD card offer high storage capacity in a small package and high data transfer rates. Other types of removable storage media may also be used for implementing the invention.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing an operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as a mouse, trackball or touch pad. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 by way of an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 197 and printer 196, which may be connected through an output peripheral interface 194 or the like.

The computer 110 preferably operates or is adaptable to operate in a networked environment using logical connections to one or more remote computers, such as a remote computer 180. The remote computer 180 may be a personal computer, a server, a router, a peer device or other network node, and typically includes some or all of the elements described above relative to the computer 110, although only a memory storage device 181 has been illustrated in FIG. 1. The logical connections depicted in FIG. 1 include a LAN 171 and a WAN 173, but may also include other networks. For example, in the present invention, the computer 110 may comprise the source machine from which data is being migrated, and the remote computer 180 may comprise the destination machine, e.g., a thin client device. Note however that source and destination machines need not be initially connected by a network or otherwise, but instead, data may be migrated by way of any media capable of being written by the source platform and read by the destination platform or platforms. For example, one non-limiting instance of such a medium is a portable flash memory medium.

When used in a LAN environment, the computer 110 is connectable to the LAN 171 through a network interface or adapter 170. The computer 110 may also include a modem 172 or other means for establishing communications over the WAN 173. The modem 172, which may be internal or external, may be connected to the system bus 121 by way of the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
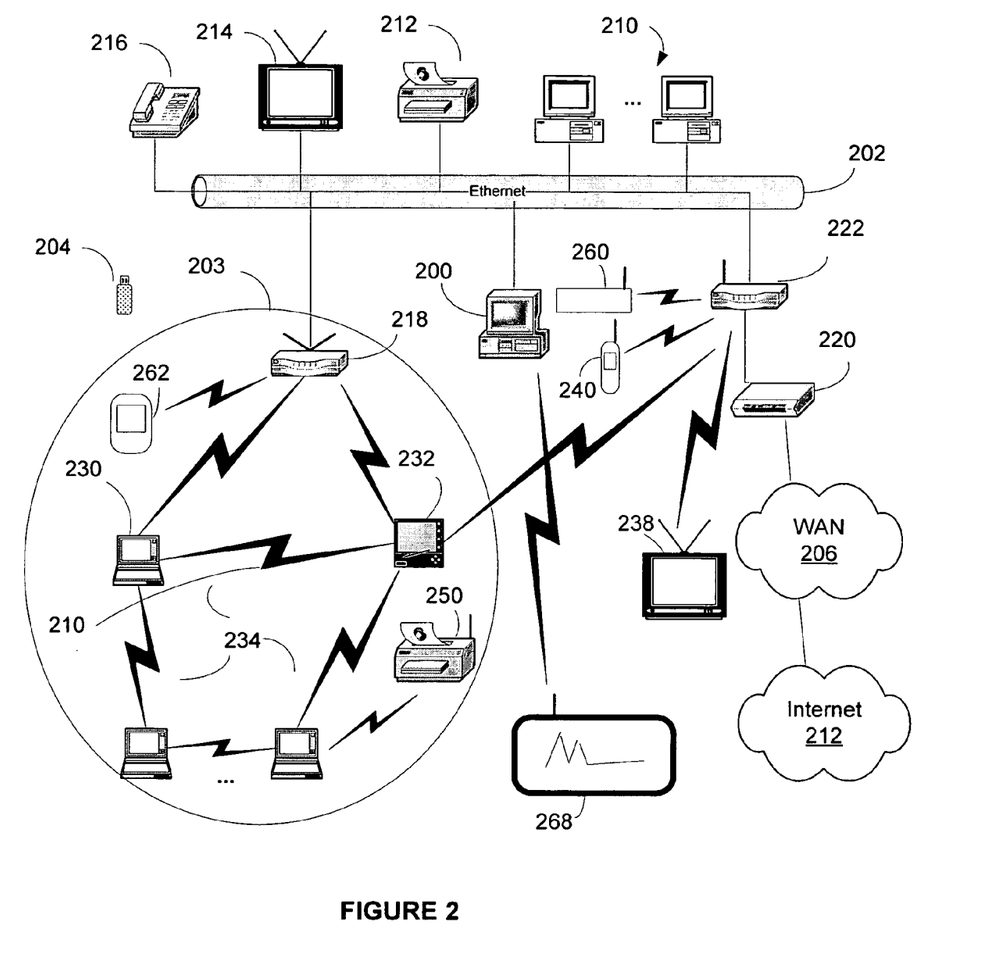
FIG. 2 is a schematic diagram illustrating an exemplary network environment having various thin client devices provisionable in accordance with various embodiments of the invention.

Turning to FIG. 2, the present invention is directed to a simple and convenient way for a user to set up thin client computing devices in a home network or the like, especially with respect to radio frequency channel selection. The term "thin client" commonly refers to a computing device that is quipped with a microprocessor but runs a simplified or reduced operation system (e.g., Windows CE of Microsoft Corporation or an "embedded" version of an operating system) and does not have or support conventional user interface I/O devices such as a monitor and a keyboard. As a result, thin client devices typically have very limited input means, such as buttons with predefined functions that a user can use to enter commands. Some of them may not even have any user-operable input means. They also typically have very limited signaling means, such as LED's as indicator lights, or a liquid crystal display (LCD) screen for displaying simple signals and messages. Due to the limited user interface I/O capabilities, it can be a very complex and laborious task to configure a thin client device. Conventionally, the task of configuring a thin client device is made easier by connecting the thin client device to a personal computer, and running a proprietary configuration program on the personal computer that interacts with the thin client device to change settings on the device. This approach becomes impractical for many new thin client devices for use in a network environment that rely on wireless transmissions for network communications. The present invention allows such thin client devices to be configured easily with desired network settings and other operation parameters with minimal user intervention.

By way of example, FIG. 2 shows an exemplary network environment having various thin client devices provisionable in keeping with various embodiments of the invention as described herein. A user's personal computer (PC) 200 is connected to an Ethernet-based local area network (LAN) 202. Other devices connected to the Ethernet include, for example, other PC's 210, a printer 212, a networkable television 214, a networkable telephone 216. The LAN may include a wireless access point 218 for forming an infrastructure wireless network. The LAN may further include a residential gateway device 222 that is connected to an external wide area network (WAN) through, for instance, a broad-band modem 220 for accessing the Internet 212. The residential gateway device 222 may also have wireless transmission capabilities to enable it to function as a wireless access point to communicate with wireless computing devices.

The network environment of FIG. 2 includes wireless networks. In an infrastructure wireless network 203, wireless computing devices communicate with each other through the wireless access point 218. An ad hoc wireless network 234 may also be formed among computing devices that communicate wirelessly in a peer-to-peer fashion without going through an access point. The wireless devices may include notebook computers 230, a tablet computing device 232, and various other types of wireless devices such as a wireless television 238, a cellular phone 240, a wireless printer 250, a media center extender 260, a pocket PC 262, a wireless picture frame 268, wireless speakers 270, a wireless media player 272, etc. Other types of existing and new wireless devices can be added to the wireless networks. Wireless devices may communicate utilizing any suitable wireless communication protocol. Examples of suitable wireless communication protocols include wireless communication protocols in accordance with the Institute of Electrical and Electronics Engineers (IEEE) 802.1x series of standards, the Bluetooth® group of standards and the Ultra-Wideband (UWB) group of standards. As can be seen, many devices in wired and wireless networks are thin client devices and can be difficult or cumbersome to configure for networking and other functions in the conventional way.

Figure 3:
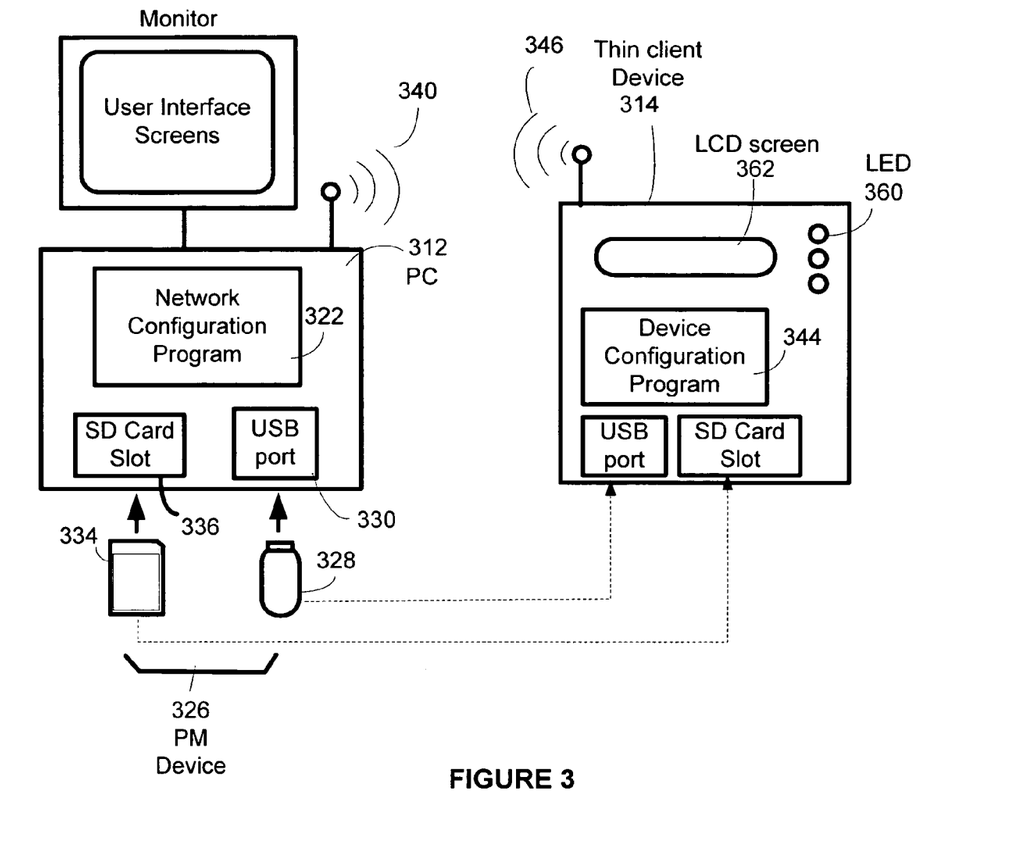
FIG. 3 is a schematic device illustration showing devices involved in the generation and transfer of configuration data and subsequent configuration of a wireless device according to an embodiment of the invention.

In accordance with a feature of the invention, the process of configuring a thin client device is made very simple and easy by using a portable media device to transfer configuration data and initiate automatic configuration of the device. Referring to FIG. 3, a configuration program 322 on a computer 312 assists a user in generating the configuration data for the thin client device 314. Once the configuration data are generated, they are stored on a portable media (PM) device 326 connected to the computer 312. The portable media device 326 may be, for example, a USB flash drive 328 that may be inserted into a USB port 330, or a SD memory card 334 that may be inserted into a SD card slot 336. It will be appreciated that the invention is not limited to these two portable memory media types, and other types of portable media may be used instead or additionally for implementing the invention.

The configuration data generated by the configuration program 322 includes network settings for the thin client device to communicate wirelessly with other computing devices on a wireless network. As will be discussed later, the network settings include, in an embodiment of the invention, an identification of a wireless channel for network communications. Depending on its network location and functions, the thin client device 314 may require network settings for other types of networks additionally. For example, the residential gateway 222 in FIG. 2 may require wireless network settings when it functions as an access point, LAN settings for communications over the Ethernet, and WAN settings for communicating with the WAN 206 through the broad band modem, which may require its own special settings. In addition to network settings, the configuration data may include other parameters pertaining to the operations of the device, such as device-specific configuration information, security information, and file sharing information.

After the configuration data are stored on the portable media device 326, the portable media device 326 is disconnected from the first computer 312 and used to transfer the configuration data to one or more thin client devices such as device 314. In a preferred embodiment, to set up a thin client device, all the user has to do is to connect the portable media device 326 to that device. The thin client device 314 detects the connection of the portable media device, and may run a configuration program 344 to load the configuration settings from the portable media device 326 and automatically configure the thin client device using the received configuration data.

Figure 4:
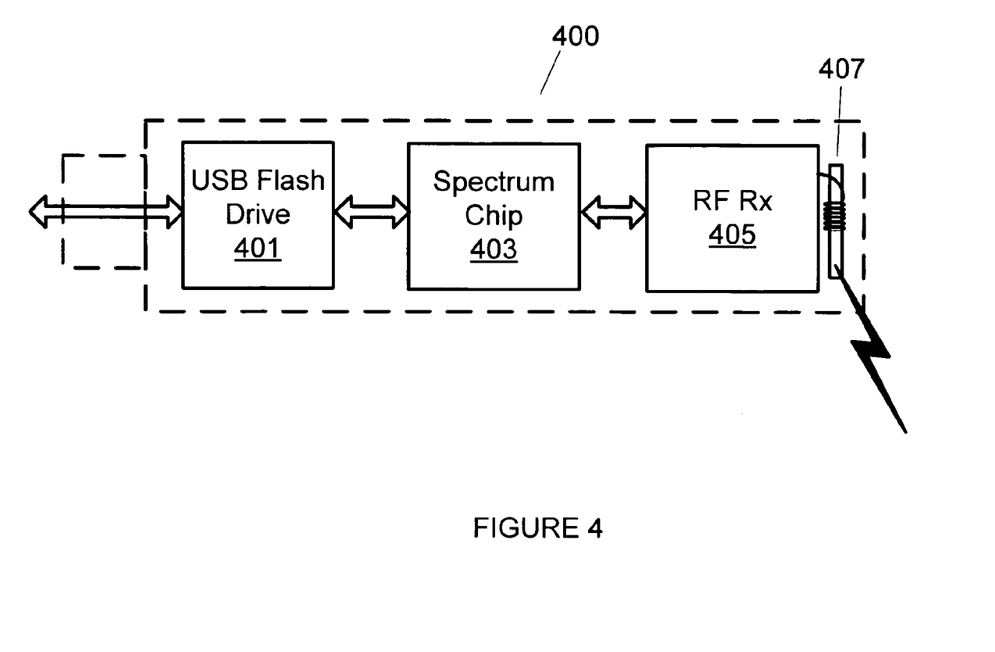
FIG. 4 is a schematic internal diagram of a USB device according to an embodiment of the invention, wherein the device includes a radio frequency spectrum analyzer.

As discussed above, the network settings include, in an embodiment of the invention, an identification of a wireless channel for the device 314 being provisioned to communicate over. A schematic view of the logical architecture of portable media device 326 in a corresponding embodiment of the invention is shown in FIG. 4. The device 326 (400) includes in overview, ordinary USB flash drive components 401 and associated functionality as well as a spectrum chip 403 and a radio frequency receiver 405. The receiver incorporates or is attached to an antenna 407. The antenna 407 may be internal or external to device 400, but is preferably internal for purposes of compactness and robustness.

The ordinary flash drive components 401 will not be described at length herein other than to point out that the components can access the spectrum chip 403 via a hardware interface as will be appreciated by those of skill in the art. In addition, it should be noted that ordinary flash drive components 401 are capable of reading data from the spectrum chip 403 over the interface as will be readily appreciated by those of skill in the art. The spectrum chip 403 may be any suitable chip, but in an embodiment of the invention the proprietary Spectrum Processor™ chip produced by Cognio™ of Waltham, Mass. is utilized. The manner in which the Spectrum Processor™ chip operates will be known to those of skill in the art, but other readers are referred, for the operation of such chips, to U.S. Pat. No. 6,785,520, entitled "System and Method for Antenna Diversity Using Equal Power Joint Maximal Ratio Combining," U.S. Pat. No. 6,728,517, entitled "Multiple-Input Multiple-Output Transceiver," U.S. Pat. No. 6,714,605, entitled "System and Method for Real-Time Spectrum Analysis in a Communication Device," U.S. Pat. No. 6,700,450, entitled "Voltage-Controlled Oscillator with an Automatic Amplitude Control Circuit," U.S. Pat. No. 6,687,492, entitled "System and Method for Antenna Diversity Using Joint Maximal Ratio Combining," and U.S. Pat. No. 6,526,264, entitled "Wideband Multi-Protocol Wireless Radio Transceiver System," each of which is herein incorporated by reference in its entirety for all that it teaches without any exclusion or limitation whatsoever, including as well the entirety of the contents of all referenced and/or incorporated materials.

The spectrum usage data provided by the chip 403 may be of any format, but in an embodiment of the invention the data is in the form of periodigram data representing spectrum data collected over a certain window of time such as one minute or ten minutes, or a longer or shorter period of time as appropriate. The user may walk or otherwise transport the device 400 throughout the location of intended use during a data gathering phase so that the gathered data accurately reflects the current interference potential at that location. The ordinary flash drive components 401 may access the data from the spectrum chip 403 as it gathered, after collection is finished, or not until the data is required during a device configuration event depending upon designer preferences.

Figure 5:
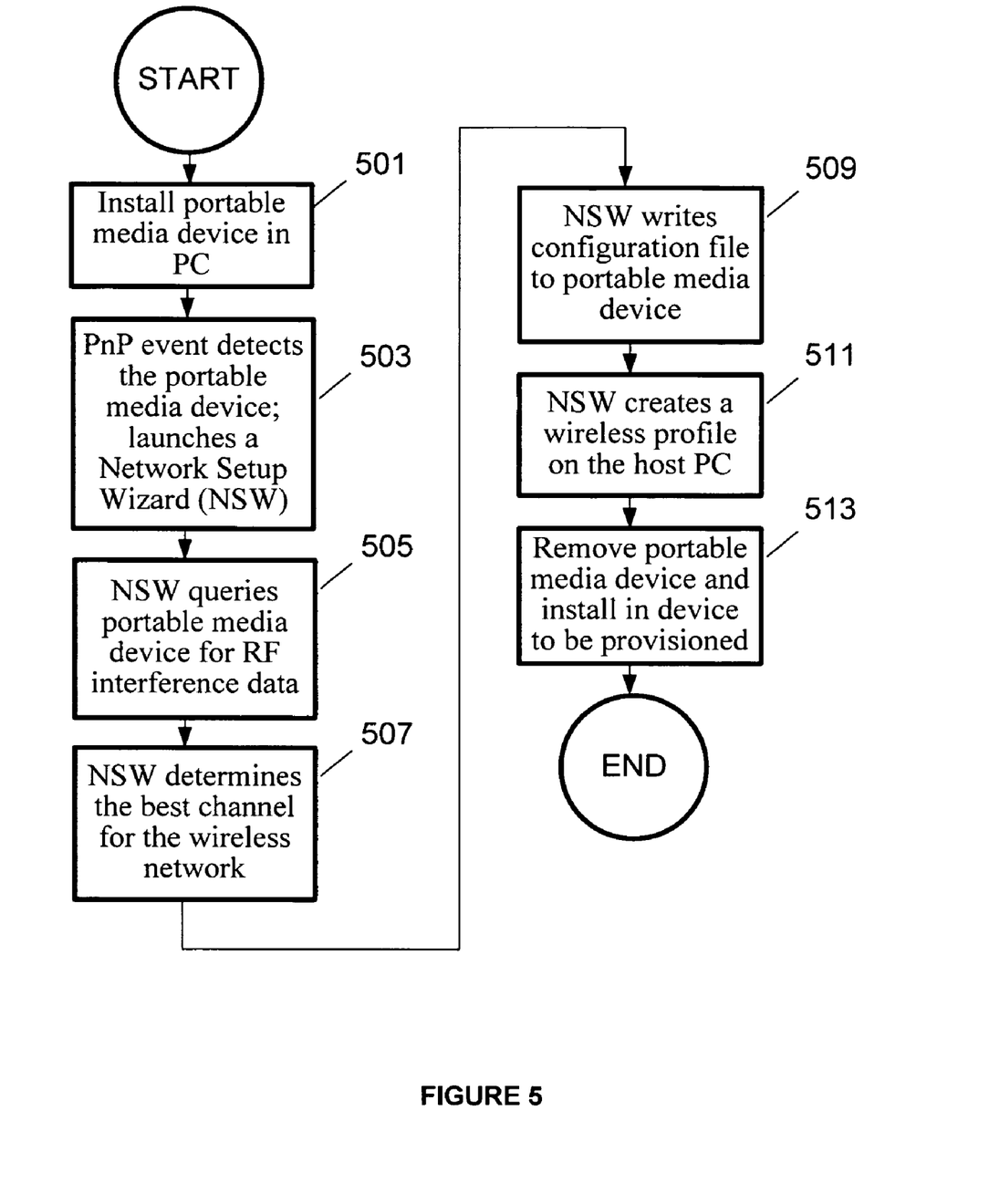
FIG. 5 is a flow chart illustrating a process of selecting an appropriate radio frequency for the wireless network to use in an embodiment of the invention.

FIG. 5 illustrates a flow chart showing a process of configuring a thin client device, in particular a wireless access point, according to an embodiment of the invention after the data gathering described above is complete. Typically, wireless network components can be categorized as devices or access points (some devices may act as both). The thin client provisioning as discussed herein pertains mainly although not exclusively to access points, since devices usually scan while access points usually do not. At step 501 of the flow chart 500, the user installs the USB flash drive or other portable memory media device into a device on the wireless network such as a PC. Subsequently at step 503, a Plug and Play (PnP) event on that host detects the portable memory media device and launches a Network Setup Wizard. The Network Setup Wizard then queries the portable memory media device for RF interference data in step 505.

At step 507, the Network Setup Wizard determines the best channel for the wireless network. Typically this determination will be made based on the level of interference on each channel. Thus, the channel with the least amount of interference on average will be selected in an embodiment of the invention as the current channel for the network. In an alternative embodiment of the invention, other criteria may additionally or alternatively be used. For example, a channel with severe but infrequent interference may be selected in preference to a channel with more constant but lower average level interference. The Network Setup Wizard then writes a configuration file to the portable memory media device in step 509, and creates a wireless profile on the host PC in step 511. Finally at step 513, the user removes the portable memory media device and installs it in the thin client device to be provisioned, and any other devices to be provisioned. When the portable media device is installed in the device to be provisioned it determines if the portable media contains valid wireless configuration information (e.g., it looks for the presence of the XML configuration file—WSETTING.WFC). If the file is present, then it is loaded into an XML parser to obtain the values of the wireless configuration information. The wireless configuration thus specified is then applied to the wireless radio. If the provisioned device is an access point, then the wireless channel information is also applied (wireless clients scan all channels).

In an embodiment of the invention, the following schema is used by the Network Setup Wizard to set the channel to be used on the wireless network:

```
<?xml version="1.0" encoding="utf-8" ?>
<xs:schema xmlns:xs="http://www.w3.org/2001/XMLSchema"
targetNamespace="http://www.microsoft.com/provisioning/Wireless
Profile/2004"
    xmlns:fc="http://www.microsoft.com/provisioning/WirelessPr
ofile/2004" elementFormDefault="qualified"
    version="1">
    <xs:element name="wirelessProfile">
        <xs:complexType>
            <xs:sequence>
                <xs:element name="config">
                    <xs:complexType>
                        <xs:sequence>
                            <xs:element name="configId"
type="fc:str36" minOccurs="1" maxOccurs="1" />
                            <xs:element
name="configHash" type="fc:str20" minOccurs="0" maxOccurs="1"
/>
                            <xs:element
name="configAuthorId" type="fc:str36" minOccurs="1"
maxOccurs="1" />
                            <xs:element
name="configAuthor" type="fc:strMax128" minOccurs="1"
maxOccurs="1"/>
                        </xs:sequence>
                    </xs:complexType>
                </xs:element>
```

-continued

```
                <xs:element name="ssid" type="fc:strMax32"
minOccurs="1" maxOccurs="1" />
                <xs:element name="connectionType"
minOccurs="1" maxOccurs="1">
                    <xs:simpleType>
                        <xs:restriction base="xs:string">
                            <xs:enumeration value="IBSS"
/>
                            <xs:enumeration value="ESS"
/>
                        </xs:restriction>
                    </xs:simpleType>
                </xs:element>
                <xs:element name="channel2Dot4"
type="xs:integer" minOccurs="0" maxOccurs="1" />
                <xs:element name="channel5Dot0"
type="xs:integer" minOccurs="0" maxOccurs="1" />
                <xs:element name="deviceMode" minOccurs="0"
maxOccurs="1">
                    <xs:simpleType>
                        <xs:restriction base="xs:string">
                            <xs:enumeration
value="infrastructure" />
                            <xs:enumeration
value="bridge" />
                            <xs:enumeration
value="repeater" />
                            <xs:enumeration
value="station" />
                        </xs:restriction>
                    </xs:simpleType>
                </xs:element>
                <xs:element name="primaryProfile"
type="fc:profileInstance" minOccurs="1" maxOccurs="1" />
                <xs:element name="optionalProfile"
type="fc:profileInstance" minOccurs="0" maxOccurs="32" >
            </xs:sequence>
        </xs:complexType>
    </xs:element>
    <xs:complexType name="profileInstance">
        <xs:sequence>
            <xs:element name="authentication" minOccurs="1"
maxOccurs="1">
                <xs:simpleType>
                    <xs:restriction base="xs:string">
                        <xs:enumeration value="open" />
                        <xs:enumeration value="shared" />
                        <xs:enumeration value="WPA-NONE"
/>
                        <xs:enumeration value="WPA" />
                        <xs:enumeration value="WPAPSK" />
                        <xs:enumeration value="WPA2" />
                        <xs:enumeration value="WPA2PSK"
/>
                    </xs:restriction>
                </xs:simpleType>
            </xs:element>
            <xs:element name="encryption" minOccurs="1"
maxOccurs="1">
                <xs:simpleType>
                    <xs:restriction base="xs:string">
                        <xs:enumeration value="none" />
                        <xs:enumeration value="WEP" />
                        <xs:enumeration value="TKIP" />
                        <xs:enumeration value="AES" />
                    </xs:restriction>
                </xs:simpleType>
            </xs:element>
            <xs:element name="networkKey" type="fc:strMax64"
minOccurs="1" maxOccurs="1" />
            <xs:element name="keyIndex" type="xs:integer"
minOccurs="0" maxOccurs="1" />
            <xs:element name="keyProvidedAutomatically"
type="xs:boolean" minOccurs="1" maxOccurs="1" />
            <xs:element name="ieee802Dot1xEnabled"
type="xs:boolean" minOccurs="1" maxOccurs="1" />
```

-continued

```
            <xs:element name="eapMethod" minOccurs="0"
maxOccurs="1">
                <xs:simpleType>
                    <xs:restriction base="xs:string">
                        <xs:enumeration value="EAP-TLS"
/>
                        <xs:enumeration value="PEAP-EAP-
MSCHAPv2" />
                        <xs:enumeration value="PEAP-EAP-
TLS" />
                    </xs:restriction>
                <xs:simpleType>
            </xs:element>
            <xs:element name="timeToLive" type="xs:integer"
minOccurs="0" maxOccurs="1" />
        </xs:sequence>
    </xs:complexType>
    <!-- Globals simpleTypes-->
    <xs:simpleType name="str36">
        <xs:restriction base="xs:string">
            <xs:length value="36" />
        </xs:restriction>
    </xs:simpleType>
    <xs:simpleType name="strMax32">
        <xs:restriction base="xs:string">
            <xs:minLength value="1" />
            <xs:maxLength value="32" />
        </xs:restriction>
    </xs:simpleType>
    <xs:simpleType name="str2O">
        <xs:restriction base="xs:string">
            <xs:length value="20" />
        </xs:restriction>
    </xs:simpleType>
    <xs:simpleType name="strMax64">
        <xs:restriction base="xs:string">
            <xs:maxLength value="64" />
            <xs:minLength value="1" />
        </xs:restriction>
    </xs:simpleType>
    <xs:simpleType name="strMax128">
        <xs:restriction base="xs:string">
            <xs:maxLength value="128" />
            <xs:minLength value="1" />
        </xs:restriction>
    </xs:simpleType>
</xs:schema>
```

As noted above, in an alternative embodiment of the invention, a PC or other computing device is not needed to select an appropriate channel based on the interference data gathered by the portable memory media. In this case, the steps of FIG. 5 are slightly altered so that an appropriate sequence of events is as follows. As before, an interference spectrum is gathered at the location for the device to be provisioned via the portable memory device. Next, a channel on which the wireless device is to operate is selected at the portable memory device by logic within the device based on the interference spectrum. Finally, an indication of the selected channel is downloaded from the first computing device to the first wireless device during provisioning. This embodiment of the invention is particularly useful when network devices are capable of provisioning and being provisioned via a portable memory device, but where the devices are not yet adapted to include radio frequency selection logic or understanding.

Figure 6:
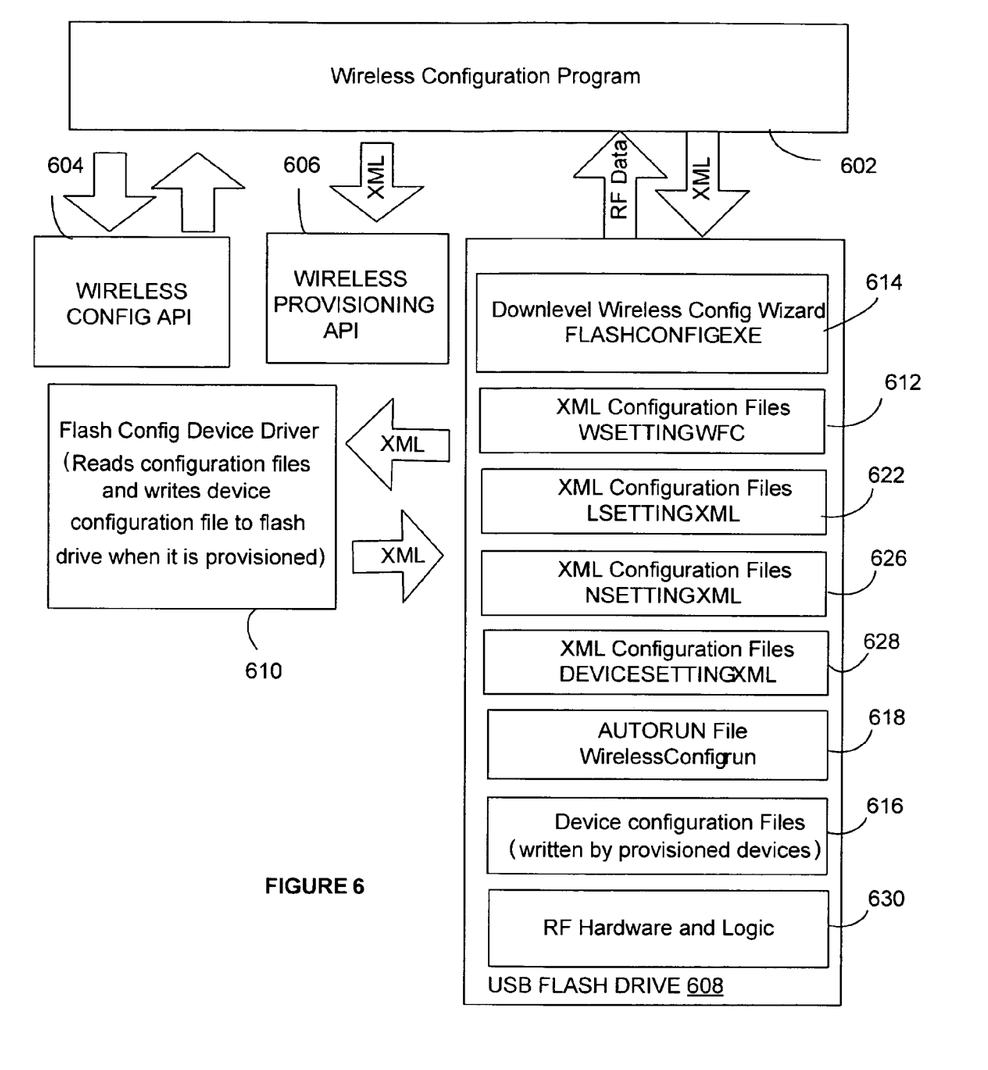
FIG. 6 is a schematic diagram of programmatic units and data employed in the configuration of a thin client device in keeping with an embodiment of the invention.

Turning now to FIG. 6, a software architecture used in an embodiment of the invention for generating network settings and other configuration data is now described. A configuration program 602 is executed on a computer and communicates with the computer through a wireless configuration application programming interface (API) 604 to generate network configuration settings. In the Windows™ operating system environment of Microsoft™ Corporation, for example, the WZCDLG.DLL library can be used for generating wireless settings.

In accordance with a feature of the embodiment, the network settings and other configuration data for the wireless ad hoc network are stored in the format of an Extensible Markup Language (XML) file. The use of an XML file presents a standard format that can be recognized by many different devices. The configuration program 602 outputs the XML files to the computer through a provisioning API 606. The configuration program 602 further outputs XML files for writing into an attached portable media device, such as a USB flash drive 608. To that end, a flash configuration device driver 610 reads configuration files and writes a device configuration file to the USB flash drive when it is provisioned. As discussed above, the USB flash drive 608 contains a radio spectrum chip and associated logic (RF Hardware and Logic 630) for gathering RF interference data and provides RF data (e.g., interference spectra) to the configuration program 602 in an embodiment of the invention. The RF data is then incorporated into the XML files that the configuration program 602 outputs for writing into the portable media device.

The configuration program 602 stores several files on the USB flash drive 608 for use in the network configuration process. In the embodiment illustrated in FIG. 6, the files include the XML files representing the generated network configuration settings. In one implementation, the XML files containing the wireless network settings are give a special extension name such as "wfc" as shown by element 612 of FIG. 6, to indicate that the file contains wireless configuration settings. Thus, when the USB flash drive is plugged into another computing device, the operating system of that device will recognize the files 612 as containing wireless network setup information and will invoke the wireless configuration program on that device to handle the files. The USB flash drive 608 may store several XML files representing the generated network configuration settings. A WSETTING.XML file 612 contains settings for a wireless network. In an embodiment of the invention, the WSETTING.XML file 612 contains the RF channel designation generated pursuant to the RF interference data transferred from the USB flash drive 608. An LSETTING.XML file 622 contains settings for a LAN. An NSETTING.XML file 628 contains settings for a WAN. These XML files are described in greater detail below. By storing network configuration settings for LAN, WAN and wireless networks, a single USB flash drive 608 can be used to configure a variety of devices (such as personal computers, routers, printers, PDAs, and WAPs) to communicate over a variety of types of networks, The USB flash drive may also be used to store device-specific configuration data, which preferably are in an XML file. In FIG. 6, the XML file containing device-specific configuration data is the DEVICE SETTING. WFC file 628.

In addition, a network setup application 614 (called "Downlevel Flash Config Wizard" in FIG. 6) may be stored on the USB flash drive 608 in order to facilitate the configuring of network settings for other devices. When the USB flash drive 608 is attached to another device, that device can run the network setup application to load the relevant network settings from the USB flash drive 608 to the other device.

As also shown in FIG. 6, the USB flash drive 608 may be used to store device configuration log files 616 that are written into the flash drive by devices that were provisioned for the wireless network using the flash drive. In one implementation, each device configuration log file is identified by a file name that contains the last 8 bytes of the MAC address of the provisioned device in ASCII-HEX format. This file name allows the computer on which the network settings are created to identify the provisioned device.

In an embodiment of the invention, the USB flash drive 608 further stores an autorun file, such as wireless.cfg 618. When the USB flash drive 608 is attached to a compatible device that recognizes the autorun file, the detection of wireless.cfg 618 automatically triggers the device to execute the network setup program 610. In this way, no user intervention is required to transfer the network settings to the device after the USB flash drive 608 has been attached.

Figure 7:
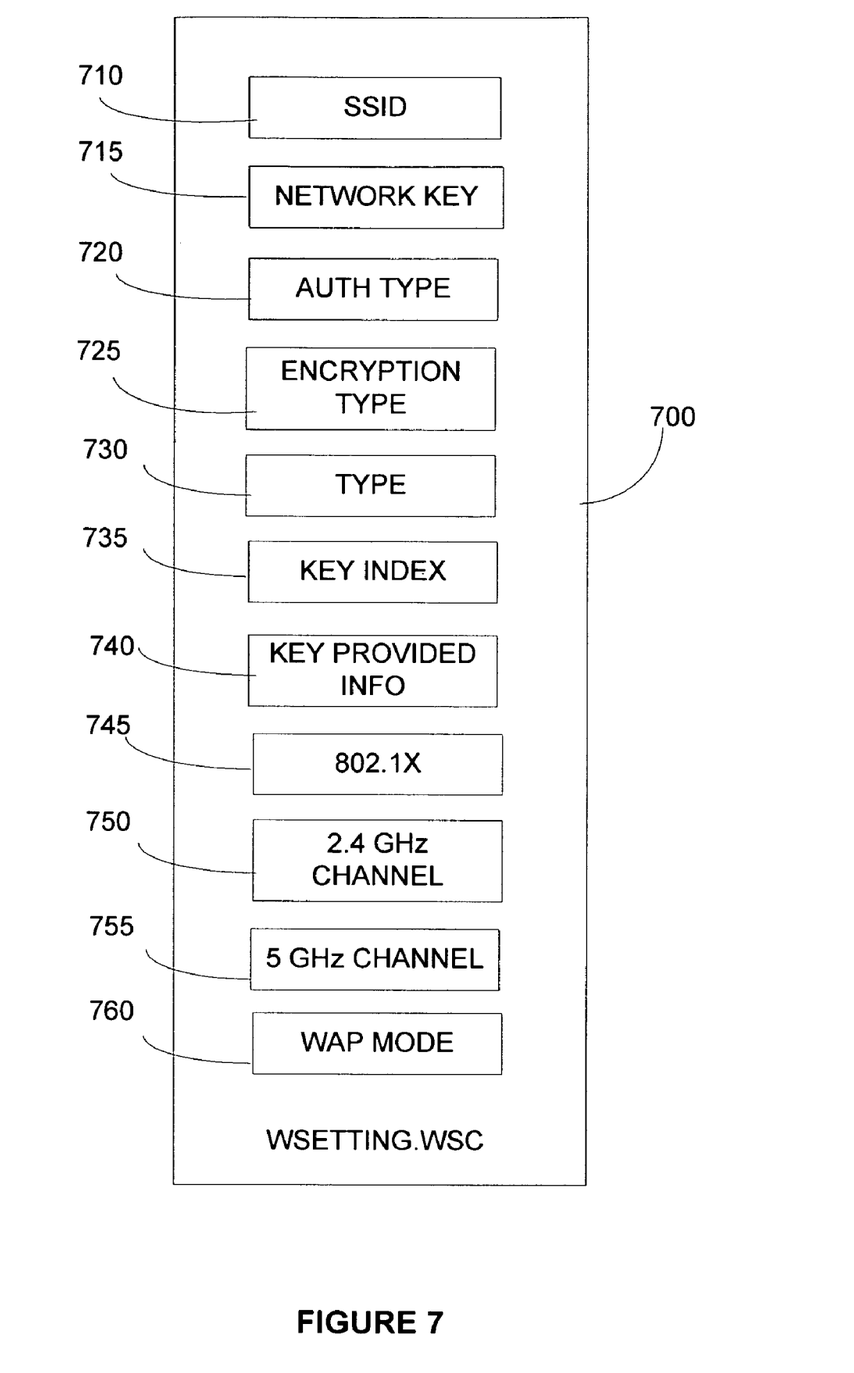
FIG. 7 is a schematic illustration of a schema corresponding to an XML file used in an embodiment of the invention to store wireless network settings on a portable media device for transfer to a thin client.

FIG. 7 illustrates a schema 700 corresponding to an XML file used in an embodiment of the invention for storing wireless network settings on a portable media device for transfer to a thin client. Each element of schema 700 represents a wireless configuration setting. Service set identifier (SSID) 710 is a 1-32 byte string representing the name of the wireless network. SSID 710 can only occur once. Network Key 715 is a string that the PC will automatically generate, or alternatively, receive from the PC user. The Network Key 715 is used for encryption on the wireless network. Authentication Type 720 indicates the authentication protocol used by the wireless network. Authentication Type 720 allows a range of possible values, including open, shared, WiFi Protected Access (WPA), WPA Pre-Shared Key (PSK), WPA-none, WPA2, or WPA2 PSK. Encryption Type 725 indicates the encryption protocol used by the wireless network. Encryption Type 725 allows a range of possible values, including none, Wireless Encryption Protocol (WEP), Temporal Key Integrity Protocol (TKIP), and Advanced Encryption Standard (AES).

Type 730 indicates a connection type, and may have as its value either extended service set (ESS) in the case of an ad hoc network, or infrastructure basic service set (IBSS) in the case of an infrastructure network. Key Index 735 indicates the location of the specific key used to encrypt messages, and may have a value of 1, 2, 3, or 4. Key Index 735 is used with WEP. Key Provided Info 740 indicates whether a key is provided automatically, and can have a value of either 0 or 1. The "802.1X" field 745 indicates whether IEEE 802.1X protocol is used on the network, and can have a value of either 0 or 1. 2.4 GHz Channel 750 indicates which 2.4 GHz Channel, if any, is being used by the wireless network, and can have a value in the range of 1 to 14. 5 GHz Channel 755 indicates which 5 GHz channel, if any, is being used by the wireless network, and can have a value of 36, 40, 44, 48, 52, 56, 60, 64, 149, 153, 157, or 161. WAP Mode 760 indicates the mode in which the wireless access point is operating. WAP Mode 760 can have a value of infrastructure, bridge, repeater, or station.

It will be appreciated that a new and useful system for provisioning wireless thin clients in a wireless network has been described. Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, patents and appendices, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Any recitation of ranges of values herein is merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

What is claimed is:

1. A method of provisioning a wireless device for use at a location in a wireless network comprising the wireless device and a first computing device operable to communicate on a selected one of a plurality of wireless communication channels, the method comprising:

detecting at the location for the wireless device an interference spectrum affecting at least a portion of the plurality of wireless communication channels via a portable memory device having therein a radio spectrum analyzer;

downloading from the portable memory device to the first computing device the interference spectrum;

selecting at the first computing device based on the interference spectrum a wireless communication channel on which the wireless device is to operate;

downloading an indication of the selected wireless communication channel from the first computing device to the portable memory device downloading the indication of the selected wireless communication channel from the portable memory device to the wireless device; and configuring the wireless device to operate on the selected wireless communication channel.

2. The method according to claim 1, wherein the wireless device is a thin client lacking a standard graphical user interface.

3. The method according to claim 1, wherein the wireless device is a wireless access point for other devices in the wireless network.

4. The method according to claim 1, wherein the wireless device is a wireless access point for the first computing device.

5. The method according to claim 1, wherein the first computing device has a standard graphical user interface and wherein the method further comprises using the graphical user interface to select configuration settings to be transferred to the wireless device via the portable memory device.

6. The method according to claim 1, wherein the portable memory device is a USB memory device.

7. The method according to claim 1, wherein the portable memory device is an SD memory device.

8. The method according to claim 1, wherein selecting a wireless communication channel on which the wireless device is to operate comprises determining which of the plurality of wireless communication channels has the least interference based on the interference spectrum.

9. A computer-readable medium having thereon computer-readable instruction for performing the method according to claim 1.

10. A method of provisioning a first wireless device for use at a location in a wireless network to communicate on a selected one of a plurality of wireless communication channels, the method comprising:

detecting at the location for the first wireless device an interference spectrum affecting at least a portion of the plurality of wireless communication channels via a portable memory device having therein a radio spectrum analyzer downloading from the portable memory device to the first computing device the interference spectrum;

selecting at the portable memory device based on the interference spectrum a wireless communication channel on which the wireless device is to operate;

downloading an indication of the selected wireless communication channel from the portable memory device to the first wireless device wherein the wireless network further comprises a second wireless device, and wherein the method further comprises downloading the indication of the selected wireless communication channel from the first computing device to the second wireless device whereby the first and second wireless devices are configured to operate on the same wireless communication channel.

11. The method according to claim 10, wherein the first wireless device is a wireless access point for at least one other device in the wireless network.

12. The method according to claim 10, wherein the portable memory device is a USB memory device.

13. The method according to claim 10, wherein the portable memory device is an SD memory device.

14. The method according to claim 10, wherein selecting at the portable memory device based on the interference spectrum a wireless communication channel on which the wireless device is to operate comprises determining which of the plurality of wireless communication channels has the least interference based on the interference spectrum.

15. A computer-readable medium having thereon computer-readable instruction for performing the method according to claim 10.

\* \* \* \* \*